Sept. 14, 1937.    L. LEITZ ET AL    2,093,282
FOCUSING MEANS FOR CAMERA OBJECTIVES
Filed Jan. 25, 1936
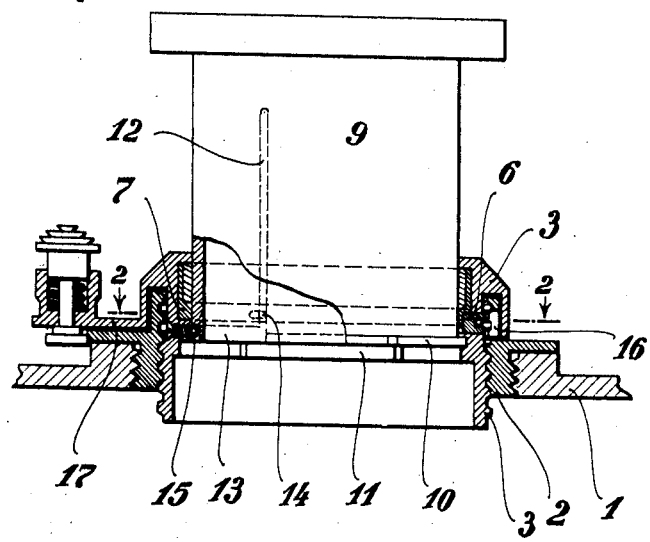
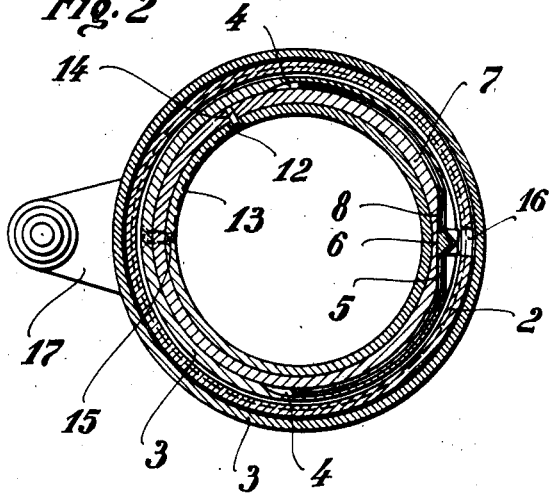
Ludwig Leitz
Wilhelm Albert
Josef Hornung
INVENTORS
BY
ATTORNEY Patented Sept. 14, 1937

2,093,282

UNITED STATES PATENT OFFICE 2,093,282

FOCUSING MEANS FOR CAMERA OBJECTIVES

Ludwig Leitz, Wilhelm Albert, and Josef Hornung, Wetzlar, Germany, assignors to Ernst Leitz G. m. b. H., Wetzlar, Germany Application January 25, 1936, Serial No. 60,762 In Germany February 6, 1935

4 Claims. (Cl. 95—45)

This invention relates to improvements in photographic cameras of the type which require that the objective be moved outward into a predetermined photographing position before being focused, and in which, after a picture has been taken, the objective is pushed back into the camera. Heretofore it has been possible to actuate the focusing lever before the objective is moved into photographing position and as a consequence many pictures were spoiled because the photographer forgot to move the objective. The object of this invention is to provide a mechanism which makes it impossible to focus the objective before it has been moved into photographing position. The mechanism includes a safety latch which automatically locks the focusing means to the camera and which is automatically unlocked when the objective is placed in focusing position. In all other positions the focusing means cannot be operated. The action is entirely automatic and makes it impossible for the photographer to accidentally forget to move the objective to extended position. In the accompanying drawing:

Fig. 1 is a plan view partly in section showing the objective in focusing position.

Fig. 2 is a vertical sectional view on the line 2—2 of Figure 1.

Referring to Figures 1 and 2 the camera is indicated at 1 having as usual a fixed bearing 2 in which the objective carrier 3 is operated in a well known manner by a focusing lever 17. The carrier 3 is provided with a semicircular recess 4 which contains a semicircular spring 5 which carries a radially movable bolt 6. The carrier 3 has a ring 7 which is cut away flat as at 8 to provide space for retracting the bolt 6 which serves to lock the carrier 3 to the fixed bearing 2. When the objective is to be focused, the bolt is automatically retracted from the bearing 2 into the recess 8 in the carrier 3 hence the latter may now be rotated in the bearing 2 to focus the camera. The usual bayonet slot connection between the objective 9 and the carrier 3 is indicated at 10 and 11. The objective is provided with a longitudinal groove 12 which communicates with an annular groove 13. A pin 14 in the ring 7 is in constant engagement with the groove 12. A set screw 15 in the carrier 3 extends into the groove 13 and limits the rotating movement of the objective with respect to the carrier as is obvious. The bearing 2 has a recess 16 adapted to receive the bolt when the objective is moved out of photographing position within the camera and whereby the carrier 3 is locked nonrotatably in the bearing 2.

The operation is as follows. Normally the objective is pushed back into the camera and the carrier 3 is locked to the bearing 2 by the bolt 6. When a picture is to be taken the objective is moved outwards, the groove 12 moving over the pin 14 and when the objective reaches its outermost photographing position it is turned and locked to the carrier in the usual manner by the bayonet catch. Thereafter the objective is rotated until the end of the groove 13 reaches the screw 15 and the ring 7 is also rotated by reason of the engagement of the pin 14 with the groove 12. The ring 7 is rotated until the flat portion 8 thereof is opposite the bolt 6. Then the spring 5 contracts to move the bolt 6 radially inwardly out of the recess 16 in the bearing 2 and into the space in the carrier 3 which is provided by the flattened cut out at 8 and thus the carrier and the objective are locked together and the objective may now be focused by operating the lever 17.

After the picture has been taken, the objective is rotated to unlock it from the bayonet catch while the carrier 3 is held fixed, hence the ring 7 is also rotated whereby to move the flat portion 8 away from the bolt 6 and cam the latter into the recess 16 in the bearing 2. Then the objective is pushed back into the camera. It will be seen therefore that when the objective is released from the bayonet catch, the bolt is moved into the fixed bearing 2 and locks the carrier thereto, hence the latter cannot be operated and focusing is impossible.

When the objective is within the camera operation of the lever 17 is impossible because the objective carrier 3 is locked to the fixed bearing 2. When the objective is moved into focusing position through an axial and rotatable movement, the objective is locked to the carrier 3 by the bayonet catch and the bolt is withdrawn from the fixed bearing 2 and the carrier can be operated to focus the objective. The parts may also be said to function in the manner that the fixed bearing 2 contains the bolt 6 which by the spring 5 is urged away from the bearing to engage the carrier. But that this operation is not possible until the objective has been locked to the carrier by the bayonet catch and at the same time has turned the ring into such a position that the recess 8 in the ring is opposite the recess 16 so that the bolt may move from its inactive position in the bearing 2 into engagement with the carrier.

It will therefore be seen that this invention provides a mechanism which compels the photographer to move the objective into photographing position before he can focus it.

We claim:

1. In a photographic carrier including a rotatable objective carrier on the outside of the camera, an objective movable in the carrier to an extreme focusing position therein outside the camera, means for locking the objective to the carrier in said focusing position, means preventing operation of the objective carrier to focus the objective until the latter has been locked to the carrier, said means comprising a bolt in the carrier for locking the same in normal nonrotatable relation to the camera and a spring within the carrier actuated by the said locking movement of the objective to move the bolt into unlocked position, said spring being actuated by the objective to again move the bolt into locked position when the objective is unlocked from the carrier.

2. In a photographic camera a rotatable objective carrier, an objective in said carrier axially movable therein from a position within the camera to an extreme focusing position outside the camera, a bayonet joint connection for locking the objective to the carrier in said position by rotation of the objective, a spring seated bolt in the carrier adapted to engage the camera to normally lock the carrier thereto in nonrotatable relation and means in the carrier operatively connected to the objective for disengaging said bolt from the camera by the said rotation of the objective outside the camera in one direction and for again causing said bolt to engage the camera by rotation of the objective in the opposite direction to unlock the objective from the carrier.

3. In a photographic camera a rotatable objective carrier, an objective in said carrier axially movable therein from a position within the camera to an extreme focusing position outside the camera, means on the carrier and the objective for locking the latter to the carrier by rotation of the objective outside the camera, a spring seated bolt in the carrier for normally locking the carrier to the camera in nonrotatable relation and a ring within the carrier actuated by the rotation of the objective for withdrawing the bolt from the camera by rotation of the objective as aforesaid to unlock the carrier from the camera.

4. In a photographic camera a fixed support, an objective carrier rotatably mounted in the support, an objective movable in the carrier from within the camera to an extreme focusing position in the carrier outside the camera, means for locking the objective to the carrier in said extreme position, means preventing operation of the carrier to focus the objective until the latter has been locked to the carrier as aforesaid, said means comprising a bolt slidably supported in the carrier and adapted to engage a recess in the said support for locking the carrier thereto in normal nonrotatable relation, a spring within the carrier for moving the bolt out of and into said recess to unlock and lock the carrier in the support and means within the carrier actuated by the objective when the latter is locked to or unlocked from the carrier for operating the said spring.

LUDWIG LEITZ.
WILHELM ALBERT.
JOSEF HORNUNG.